(12) United States Patent
Dong et al.

(10) Patent No.: US 12,306,071 B2
(45) Date of Patent: May 20, 2025

(54) METHOD AND SYSTEM FOR IDENTIFYING CAVITY POSITION OF STRUCTURE BASED ON GLOBAL SEARCH

(71) Applicant: CENTRAL SOUTH UNIVERSITY, Changsha (CN)

(72) Inventors: Longjun Dong, Changsha (CN); Yongchao Chen, Changsha (CN); Qingchun Hu, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 390 days.

(21) Appl. No.: 17/791,533

(22) PCT Filed: Mar. 23, 2020

(86) PCT No.: PCT/CN2020/080623
§ 371 (c)(1),
(2) Date: Jul. 8, 2022

(87) PCT Pub. No.: WO2021/139006
PCT Pub. Date: Jul. 15, 2021

(65) Prior Publication Data
US 2023/0035322 A1 Feb. 2, 2023

(30) Foreign Application Priority Data
Jan. 8, 2020 (CN) .......................... 202010019166.3

(51) Int. Cl.
*G01M 5/00* (2006.01)
(52) U.S. Cl.
CPC ................. *G01M 5/0066* (2013.01)
(58) Field of Classification Search
CPC .................................................. G01M 5/0066
(Continued)

(56) References Cited

U.S. PATENT DOCUMENTS

| 5,528,557 A * | 6/1996 | Horn ...................... G01N 29/14 |
| | | 367/129 |
| 6,628,567 B1 * | 9/2003 | Prosser .................... G01H 1/00 |
| | | 367/13 |

(Continued)

FOREIGN PATENT DOCUMENTS

| CN | 101907606 A | 12/2010 |
| CN | 104807883 A | 7/2015 |

(Continued)

OTHER PUBLICATIONS

Machine translation of CN 106124632-B (Year: 2016).*

(Continued)

*Primary Examiner* — John E Breene
*Assistant Examiner* — Rose M Miller
(74) *Attorney, Agent, or Firm* — Bayramoglu Law Offices LLC

(57) ABSTRACT

A method and system for identifying a cavity position of a structure based on global search includes: step 1: using a structure requiring cavity position identification as a target area, arranging acoustic emission sensors at key positions of the target area, and acquiring actual travel time of signals between the acoustic emission sensors on site; step 2: constructing cavity models for the target area; and for each cavity model, tracking shortest paths of signal propagation between the acoustic emission sensors when each cavity model exists in the target area, to obtain theoretical travel time of the signals; and step 3: respectively calculating deviations between the theoretical travel time and the actual travel time of the signals between the acoustic emission sensors corresponding to each cavity model, and using a position of a cavity model corresponding to a minimum deviation as an identified cavity position in the target area.

9 Claims, 2 Drawing Sheets

(58) Field of Classification Search
USPC .......................................................... 73/587
See application file for complete search history.

(56) References Cited

U.S. PATENT DOCUMENTS

2007/0012112 A1* 1/2007 Kim ....................... G01H 9/004
73/594
2012/0330570 A1* 12/2012 Hedl .................... G01N 29/245
702/39

FOREIGN PATENT DOCUMENTS

| CN | 104931584 A |   | 9/2015 |
|----|-------------|---|--------|
| CN | 106124632 B | * | 5/2018 |
| CN | 109828235 A |   | 5/2019 |
| CN | 109828236 A |   | 5/2019 |
| IN | 102129063 A |   | 7/2011 |
| UA | 27486 U     |   | 11/2007 |

OTHER PUBLICATIONS

Xu Huadong, et al., Effects of Cavity on Propagation Path of Stress Wave in Wood, Journal of Northeast Forestry University, 2014, pp. 82-84,88, vol. 42, No. 4.

* cited by examiner

METHOD AND SYSTEM FOR IDENTIFYING CAVITY POSITION OF STRUCTURE BASED ON GLOBAL SEARCH

CROSS REFERENCE TO THE RELATED APPLICATIONS

This application is the national phase entry of International Application No. PCT/CN2020/080623, filed on Mar. 23, 2020, which is based upon and claims priority to Chinese Patent Application No. 202010019166.3, filed on Jan. 8, 2020, the entire contents of which are incorporated herein by reference.

TECHNICAL FIELD

The present invention relates to the technical field of non-destructive testing and safety monitoring, and in particular, to a method and system for identifying a cavity position of a structure based on global search.

BACKGROUND

Nowadays, all walks of life have increasingly high requirements for structural integrity. This is because whether there are cavities M a structure is related to the stability of the entire structure. How to effectively detect cavities and take corresponding measures has become a research project for those skilled in the art.

As far as the current research is concerned, the methods for identifying (locating) a cavity position of a structure are relatively complex. Therefore, it is very necessary to seek a simple, ease-to-implement, and highly reliable identification method and system.

SUMMARY

A technical problem resolved in the present invention is to provide, in view of the complexity of the existing methods for identifying a cavity position of a structure, a method and system for identifying a cavity position of a structure based on global search, which is simple, easy-to-implement, and highly reliable.

To resolve the foregoing technical problem, the technical solutions adopted in the present invention are as follows:

A method for identifying a cavity position of a structure based on global search is provided, including the following steps:

step 1: using a structure requiring cavity position identification as a target area, arranging a plurality of acoustic emission sensors at key positions of the target area, and acquiring actual travel time (actual propagation time) of signals between the acoustic emission sensors on site;

step 2: constructing a plurality of cavity models for the target area; and for each cavity model, tracking shortest paths (shortest time paths) of signal propagation between the acoustic emission sensors when each cavity model exists in the target area, to obtain theoretical travel time (theoretical propagation time) of the signals between the acoustic emission sensors; and step 3: respectively calculating deviations between the theoretical travel time and the actual travel time of the signals between the acoustic emission sensors corresponding to each cavity model, and using a position of a cavity model corresponding to a minimum deviation as an identified cavity position in the target area.

Further, in step 1, a method for arranging the plurality of acoustic emission sensors at key positions of the target area is: arranging m acoustic emission sensors at different positions of the target area, m being an integer greater than or equal to 4. The quantity of the acoustic emission sensors is related to the accuracy of cavity locating, and a larger quantity indicates higher accuracy. Positions of the acoustic emission sensors are known.

Further, the acoustic emission sensors need to be provided with a function of actively transmitting a pulse signal (sound wave signal). The pulse signal may be received by the acoustic emission sensors and specially marked to distinguish a microseismic signal.

Further, in step 1, suppose that an active seismic source, that is, an acoustic emission sensor that transmits a pulse signal, is $S_l$, coordinates of the active seismic source are $(x_l, y_l, z_l)$, a moment at which the active seismic source transmits the pulse signal is coordinates of a $k^{th}$ acoustic emission sensor $S_k$ that receives the pulse signal is $(x_k, y_k, z_k)$, and an actual moment at which the pulse signal transmitted by $S_l$ is $t^0_k$, a difference between an actual moment at which the acoustic emission sensor $S_l$ transmits the pulse signal and an actual moment at which the acoustic emission sensor $S_k$ receives the pulse signal is represented by $\Delta t_0^{lk}$, that is, actual travel time $\Delta t_0^{lk}$ is:

$$\Delta t_0^{lk} = t_0^k - t_0^l.$$

Further, in step 2, a method for constructing the cavity models is as follows:

dividing the target area into blocks according to a specific ratio to obtain n block intersections, and using each block intersection as a sample point to obtain a set including n sample points; traversing all the sample points (x,y,z) in the set and all possible values of a radius r; and respectively constructing a spherical cavity model $P_{xyzr}$ with a radius of r by using each sample point (x,y,z) as a sphere center, to obtain all the cavity models in the target area, where the value of r is an integer multiple of a block length len, and is less than or equal to a maximum value among a length, a width, and a height of the target area.

Further, in step 2, a commonly used shortest path tracking method is used to track the shortest paths of signal propagation between the acoustic emission sensors when each cavity model exists in the target area, to obtain the theoretical travel time of the signals between the acoustic emission sensors. Commonly used shortest path tracking methods include an A* algorithm, an ant colony algorithm, and a particle swarm algorithm.

Further, when the cavity model $P_{xyzr}$ exists in the target area, a tracked shortest path between the acoustic emission sensor $S_l$ that transmits a pulse and the acoustic emission sensor $S_k$ that receives the pulse is $L_{xyzr}^{lk}$, and a propagation speed of the pulse signal (in the target area, it is assumed that the propagation speed of the pulse signal in a non-cavity area is a constant value and is unknown) is V, theoretical travel time of the signal between $S_l$ and $S_k$ is:

$$\Delta t_{xyzr}^{lk} = L_{xyzr}^{lk} / V.$$

Further, in step 3, according to a square of a difference between the theoretical travel time $\Delta t_{xyzr}^{lk}$ and the actual travel time $\Delta t_0^{lk}$, a deviation D is introduced to describe the deviation degree of $P_{xyzr}$ from an unknown cavity of the structure, and a deviation calculation formula is:

$$D_{xyzr} = \sum_{l,k} \left( \Delta t_{xyzr}^{lk} - \Delta t_0^{lk} \right)^2$$

Each cavity model obtains a corresponding value of $D_{xyzr}$. A larger value of $D_{xyzr}$ indicates a greater deviation degree of $P_{xyzr}$ from the unknown cavity of the structure. Therefore, coordinates (x,y,z) corresponding to the smallest $D_{xyzr}$ are used as coordinates of a sphere center of an identified cavity inside the structure, and the corresponding r is the radius of the identified cavity inside the structure.

The present invention further discloses a system for identifying a cavity position of a structure based on global search, including a plurality of acoustic emission sensors and a data processing module, where
- the plurality of acoustic emission sensors are respectively arranged in a target area, that is, arranged at a plurality of different positions of a structure requiring cavity position identification, and are configured to acquire the actual travel time of signals between the acoustic emission sensors on site; and
- the data processing module is configured to: first construct a plurality of cavity models for the target area; for each cavity model, track shortest paths of signal propagation between the acoustic emission sensors when each cavity model exists in the target area, to obtain theoretical travel time of the signals between the acoustic emission sensors; and finally respectively calculate deviations between the theoretical travel time and the actual travel time of the signals between the acoustic emission sensors corresponding to each cavity model, and use a position of a cavity model corresponding to a minimum deviation as an identified cavity position in the target area.

The system uses the foregoing method for identifying a cavity position of a structure based on global search to identify the cavity position inside the structure.

The beneficial effects are as follows:

Acoustic emission has an increasingly wide range of applications with the maturity of acoustic emission technologies. As a dynamic non-destructive testing technology, acoustic emission can continuously monitor internal damage of a structure, and is applied to detecting the internal integrity of a structure in the present invention. The present invention takes into account the actual propagation status of elastic waves in medium. That is when an elastic wave propagates in a complex structure (material) including a cavity, a shortest time path between a seismic source and a station is a curve trajectory bypassing the cavity, and is no longer equivalent to a shortest distance path between the two points. Based on this, a shortest path of the elastic wave (acoustic wave) propagating from the seismic source to an acoustic emission sensor bypassing the cavity inside the structure is tracked, so that the shortest path is close to an actual path. In this way, the specific position and size of the cavity in the structure can be identified. The present invention has clear steps and is easy to operate, which does not require the measurement of the wave speed in advance and considers the actual propagation path of an elastic wave, thereby achieving high practicability and precise cavity locating. The present invention can be applied to many fields such as atomic energy, aviation, aerospace, metallurgical materials, earthquake, geology, petroleum, chemical, electric power, mining, and construction.

DETAILED DESCRIPTION

The present invention is further described with reference to the accompanying drawings and specific embodiments.

Embodiment 1

Figure 1:
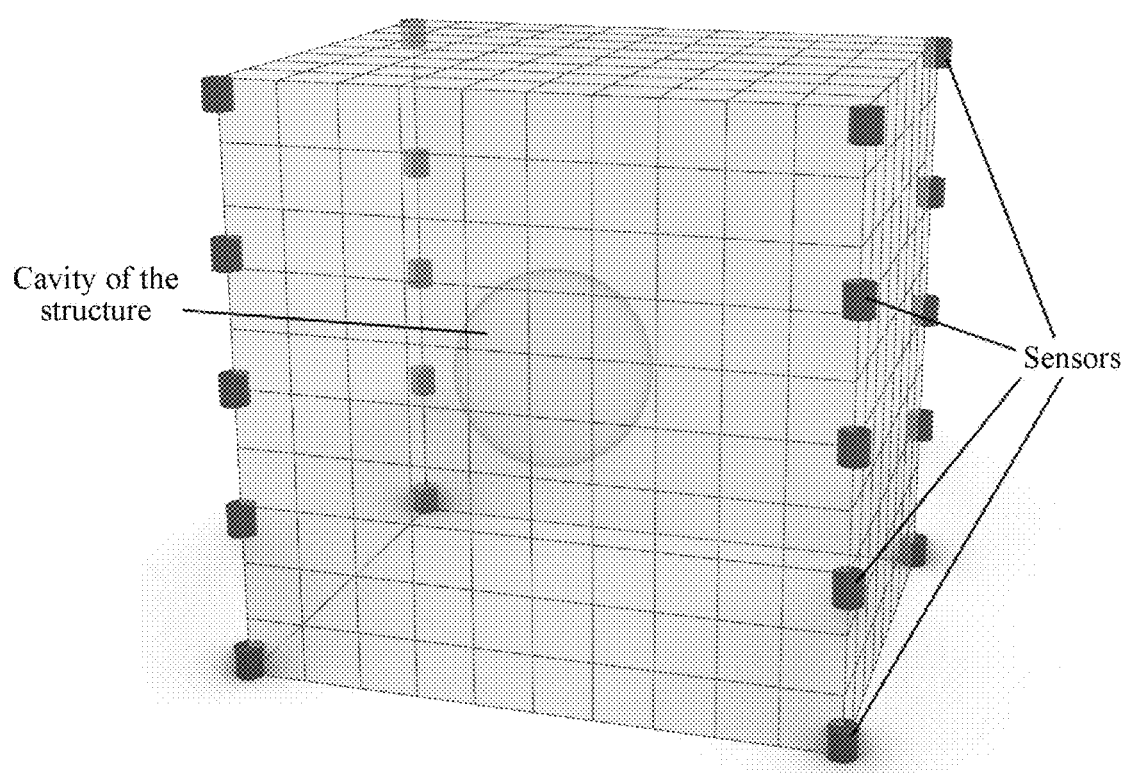
FIG. 1 is a schematic diagram of arrangement of acoustic emission sensors according to an embodiment of the present invention.

This embodiment discloses a method for identifying a cavity position of a structure based on global search, including the following steps:
- step 1 using a structure requiring cavity position identification as a target area, arranging a plurality of acoustic emission sensors as shown in FIG. 1) at key positions of the target area, and acquiring actual travel time of signals between the acoustic emission sensors on site;
- step 2: constructing a plurality of cavity models for the target area; and for each cavity model, tracking shortest paths of signal propagation between the acoustic emission sensors when each cavity model exists in the target area, to obtain theoretical travel time of the signals between the acoustic emission sensors; and
- step 3: respectively calculating deviations between the theoretical travel time and the actual travel time of the signals between the acoustic emission sensors corresponding to each cavity model, and using a position of a cavity model corresponding to a minimum deviation as an identified cavity position in the target area.

Embodiment 2

Based on Embodiment 1, according to this embodiment, in step 1, a method for arranging the plurality of acoustic emission sensors at key positions of the target area is: arranging m acoustic emission sensors at different positions of the target area, m being an integer greater than or equal to 4.

Embodiment 3

Based on Embodiment 2, according to this embodiment, all the acoustic emission sensors have a pulse signal emission function.

Embodiment 4

Based on Embodiment 3, according to this embodiment, in step 1, suppose that an active seismic source, that is, an acoustic emission sensor that transmits a pulse signal, is $S_l$, coordinates of the active seismic source are $(x_l, y_l, z_l)$, a moment at which the active seismic source transmits the pulse signal is $t_0^l$, coordinates of a $k^{th}$ acoustic emission sensor $S_k$ that receives the pulse signal is $(x_k, y_k, z_k)$ and an actual moment at which the pulse signal transmitted by $S_l$ is $t_0^k$, actual travel time of the signal between the acoustic emission sensor $S_l$ and the acoustic emission sensor $S_k$ is: $\Delta t_0^{lk} = t_0^k - t_0^l$.

Embodiment 5

Based on Embodiment 4, according to this embodiment, in step 2, a commonly used shortest path tracking method is used to track the shortest paths of signal propagation between the acoustic emission sensors when each cavity model exists in the target area, to obtain the theoretical travel time of the signals between the acoustic emission sensors.

Embodiment 6

Based on Embodiment 4, according to this embodiment, in step 2, a method for constructing the cavity models is as follows:
dividing the target area into blocks according to a specific ratio to obtain n block intersections, and using each block intersection as a sample point to obtain a set including n sample points; traversing all the sample points (x,y,z) in the set and all possible values of a radius r; and respectively constructing a spherical cavity model $P_{xyzr}$ with a radius of r by using each sample point (x,y,z) as a sphere center, to obtain all the cavity models in the target area, where the value of r is an integer multiple of a block length len, and is less than or equal to a maximum value among a length, a width, and a height of the target area.

Embodiment 7

Based on Embodiment 6, according to this embodiment, when the cavity model $P_{xyzr}$ exists in the target area, a tracked shortest path between the acoustic emission sensor $S_l$ that transmits a pulse signal and the acoustic emission sensor $S_k$ that receives the pulse is $L_{xyzr}^{lk}$, and a propagation speed of the pulse signal is V, theoretical travel time of the signal between the acoustic emission sensor $S_l$ and the acoustic emission sensor $S_k$ is: $\Delta t_{xyzr}^{lk} = L_{xyzr}^{lk}/V$.

Embodiment 8

Based on Embodiment 7, according to this embodiment, in step 3, a deviation calculation formula is:

$$D_{xyzr} = \Sigma_{l,k=1}^{m} (\Delta_{xyzr}^{lk} - \Delta t_0^{lk})^2.$$

Figure 2:
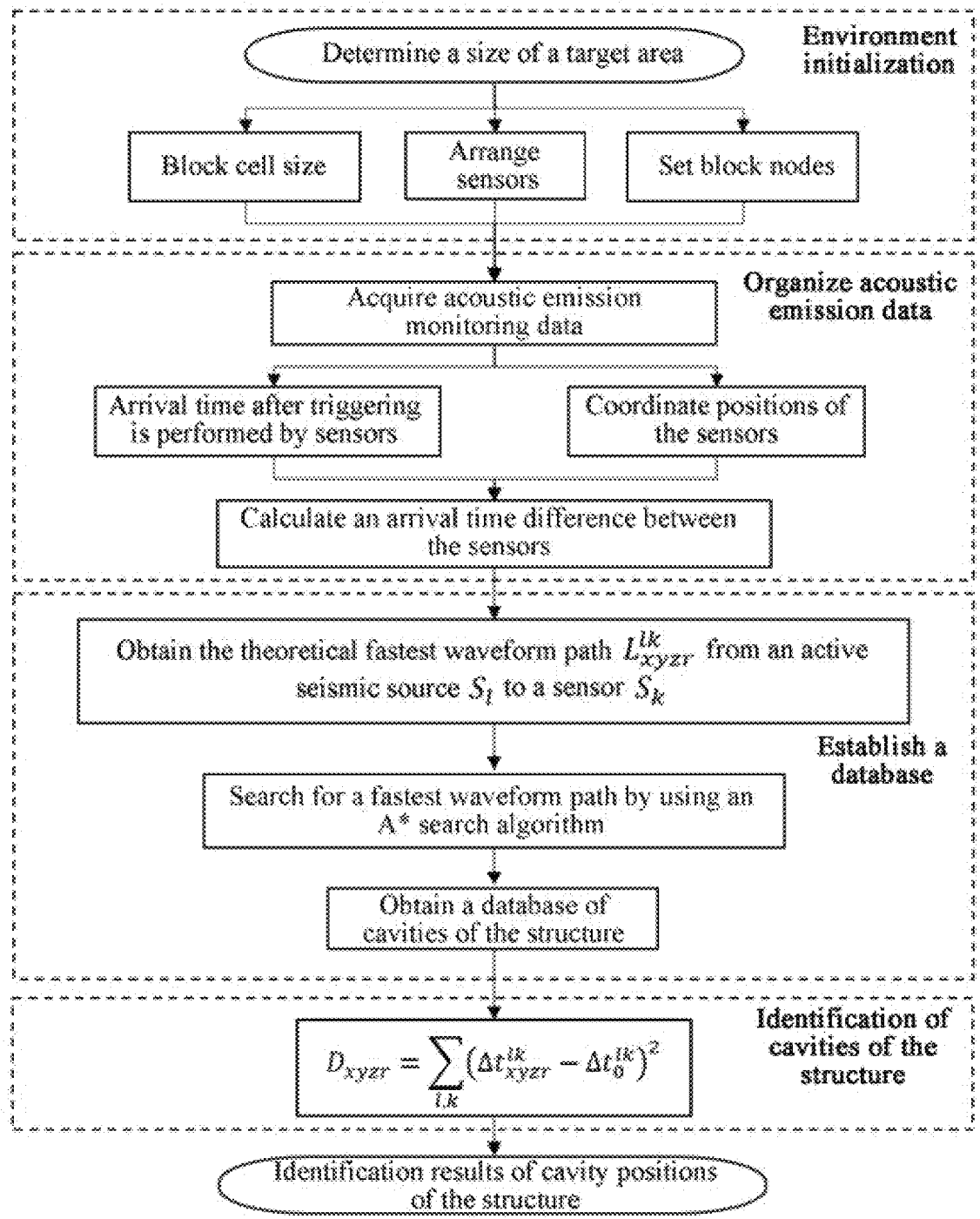
FIG. 2 is a flowchart according to an embodiment of the present invention.

A process of the method in this embodiment is shown in FIG. 2.

Embodiment 9

This embodiment discloses a system for identifying a cavity position of a structure based on global search, including a plurality of acoustic emission sensors and a data processing module, where
the plurality of acoustic emission sensors are respectively arranged in a target area, that is, arranged at a plurality of different positions of a structure requiring cavity position identification, and are configured to acquire actual travel time of signals between the acoustic emission sensors on site; and
the data processing module is configured to: first construct a plurality of cavity models for the target area; for each cavity model, track shortest paths of signal propagation between the acoustic emission sensors when each cavity model exists in the target area, to obtain theoretical travel time of the signals between the acoustic emission sensors; and finally respectively calculate deviations between the theoretical travel time and the actual travel time of the signals between the acoustic emission sensors corresponding to each cavity model, and use a position of a cavity model corresponding to a minimum deviation as an identified cavity position in the target area.

The system in this embodiment uses the method for identifying a cavity position of a structure based on global search according to any one of the foregoing Embodiments 1 to 8 to identify the cavity position inside the structure.

What is claimed is:

1. A method for identifying a cavity position of a structure based on global search, comprising the following steps:
step 1: using a structure requiring cavity position identification as a target area, arranging a plurality of acoustic emission sensors at key positions of the target area, and acquiring an actual travel time of signals between the plurality of acoustic emission sensors on site;
step 2: constructing a plurality of cavity models for the target area; and for each of the plurality of cavity models, tracking shortest paths of a signal propagation between the plurality of acoustic emission sensors when each of the plurality of cavity models exists in the target area, to obtain a theoretical travel time of the signals between the plurality of acoustic emission sensors; and
step 3: respectively calculating deviations between the theoretical travel time and the actual travel time of the signals between the plurality of acoustic emission sensors corresponding to each of the plurality of cavity models, and using a position of a cavity model corresponding to a minimum deviation as an identified cavity position in the target area.

2. The method according to claim 1, wherein in step 1, a method for arranging the plurality of acoustic emission sensors at the key positions of the target area is: arranging m acoustic emission sensors at different positions of the target area, m being an integer greater than or equal to 4.

3. The method according to claim 2, wherein all the m acoustic emission sensors have a pulse signal emission function.

4. The method according to claim 3, wherein in step 1, suppose that an active seismic source is $S_l$, the active seismic source is an acoustic emission sensor transmitting a pulse signal, coordinates of the active seismic source are $(x_l, y_l, z_l)$, a moment at which the active seismic source transmits the pulse signal is $t_0^l$, coordinates of a $k^{th}$ acoustic emission sensor $S_k$ receiving the pulse signal is $(x_k, y_k, z_k)$, and an actual moment at which the pulse signal transmitted by $S_l$ is $t_0^k$, an actual travel time of the pulse signal between the acoustic emission sensor $S_l$ and the $k^{th}$ acoustic emission sensor $S_k$ is: $\Delta t_0^{lk} = t_0^k - t_0^l$.

5. The method according to claim 4, wherein in step 2, a commonly used shortest path tracking method is used to track the shortest paths of the signal propagation between the plurality of acoustic emission sensors when each of the plurality of cavity models exists in the target area, to obtain the theoretical travel time of the signals between the plurality of acoustic emission sensors.

6. The method according to claim 4, wherein in step 2, a method for constructing the plurality of cavity models is:
dividing the target area into blocks according to a specific ratio to obtain n block intersections, and using each of the n block intersections as a sample point to obtain a set including n sample points; traversing all the n sample points (x,y,z) in the set and all possible values of a radius r; and respectively constructing a spherical cavity model $P_{xyzr}$ with a radius of r by using each of the n sample points (x,y,z) as a sphere center, to obtain the plurality of cavity models in the target area, wherein the value of r is an integer multiple of a block length len, and is less than or equal to a maximum value among a length, a width, and a height of the target area.

7. The method according to claim 6, wherein when the spherical cavity model $P_{xyzr}$ exists in the target area, a tracked shortest path between the acoustic emission sensor $S_l$ transmitting the pulse signal and the $k^{th}$ acoustic emission sensor $S_k$ receiving the pulse signal is $L_{xyzr}^{lk}$, and a propagation speed of the pulse signal is V, a theoretical travel time of the pulse signal between the acoustic emission sensor $S_l$ and the $k^{th}$ acoustic emission sensor $S_k$ is: $\Delta t_{xyzr}^{lk} = L_{xyzr}^{lk}/V$.

8. The method according to claim 7, wherein in step 3, a deviation calculation formula is:

$$D_{xyzr} = \Sigma_{l,k=1}^{m}(\Delta t_{xkyzr}^{lk} - \Delta t_0^{lk})^2.$$

9. A system for identifying a cavity position of a structure based on global search, comprising a plurality of acoustic emission sensors and a data processing module, wherein the plurality of acoustic emission sensors are respectively arranged in a target area, the target area comprises a plurality of different positions of the structure requiring a cavity position identification, and the plurality of acoustic emission sensors are configured to acquire an actual travel time of signals between the plurality of acoustic emission sensors on site; and the data processing module is configured to: first construct a plurality of cavity models for the target area; for each of the plurality of cavity models, track shortest paths of a signal propagation between the plurality of acoustic emission sensors when each of the plurality of cavity models exists in the target area, to obtain a theoretical travel time of the signals between the plurality of acoustic emission sensors; and finally respectively calculate deviations between the theoretical travel time and the actual travel time of the signals between the plurality of acoustic emission sensors corresponding to each of the plurality of cavity models, and use a position of a cavity model corresponding to a minimum deviation as an identified cavity position in the target area.

* * * * *